United States Patent
Okuma

(10) Patent No.: US 12,300,010 B2
(45) Date of Patent: May 13, 2025

(54) TRAINING OF NEURAL NETWORKS IN WHICH DEFORMATION PROCESSING OF TRAINING DATA IS ADJUSTED SO THAT DEFORMED CHARACTER IMAGES ARE NOT TOO SIMILAR TO CHARACTER IMAGES OF ANOTHER CLASS

(71) Applicant: CANON KABUSHIKI KAISHA, Tokyo (JP)

(72) Inventor: Keisui Okuma, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 216 days.

(21) Appl. No.: 17/837,523

(22) Filed: Jun. 10, 2022

(65) Prior Publication Data

US 2022/0406082 A1    Dec. 22, 2022

(30) Foreign Application Priority Data

Jun. 16, 2021    (JP) .................. 2021-100215

(51) Int. Cl.
*G06V 30/16*    (2022.01)
*G06V 30/19*    (2022.01)
*G06V 30/30*    (2022.01)

(52) U.S. Cl.
CPC .... *G06V 30/1607* (2022.01); *G06V 30/19093* (2022.01); *G06V 30/19147* (2022.01); *G06V 30/19173* (2022.01); *G06V 30/30* (2022.01)

(58) Field of Classification Search
CPC ......... G06V 30/1607; G06V 30/19093; G06V 30/19147; G06V 30/19173; G06V 30/30
See application file for complete search history.

(56) References Cited

U.S. PATENT DOCUMENTS

2020/0320325 A1    10/2020    Okuma ............ G06V 30/19147
2021/0234975 A1    7/2021    Okuma ......... G06T 2207/20081

FOREIGN PATENT DOCUMENTS

CN    109961068 A   *   7/2019
JP    2004242813 A   *   9/2004
(Continued)

OTHER PUBLICATIONS

Arica, N., Yarman-Vural, F.T., "An Overview of Character Recognition Focused on Off-Line Handwriting," 2001, IEEE Transactions on Systems, Man, and Cybernetics—Part C: Applications and Reviews, vol. 31, No. 2, p. 216-232. (Year: 2001).*

(Continued)

*Primary Examiner* — Siamak Harandi
*Assistant Examiner* — Daniella M. DiGuglielmo
(74) *Attorney, Agent, or Firm* — Venable LLP

(57) ABSTRACT

In a scene where a pseudo character image is generated by performing deformation processing for a character image, a character image that impedes training is suppressed from being generated. Based on a condition relating to a parameter that is used for the deformation processing and associated with a first class, a parameter of the deformation processing is determined and the deformation processing is performed for a character image belonging to the first class using the determined parameter. Then, whether or not the deformed character image generated by the deformation processing is similar to a character image belonging to a class different from the first class is determined and in a case where similarity is determined, the condition associated with the first class is updated.

5 Claims, 10 Drawing Sheets

(56) References Cited

FOREIGN PATENT DOCUMENTS

| | | | |
|---|---|---|---|
| JP | 3860287 B2 * | 12/2006 | ......... G06K 9/00369 |
| JP | 4087191 B2 * | 5/2008 | |
| JP | 2010182167 A * | 8/2010 | |
| JP | 2015-069256 | 4/2015 | |
| JP | 2015069256 A * | 4/2015 | |
| KR | 102122560 B1 * | 6/2020 | |

OTHER PUBLICATIONS

Jain, A.K., Zongker, D., "Representation and Recognition of Handwritten Digits Using Deformable Templates," 1997, IEEE Transactions on Pattern Analysis and Machine Intelligence, vol. 19, No. 12, p. 1386-1391. (Year: 1997).*
U.S. Appl. No. 17/837,564, filed:Jun. 10, 2022.
U.S. Appl. No. 17/837,657, filed Jun. 10, 2022.

* cited by examiner

| ID | Character Image | Correct Answer Class | |
|---|---|---|---|
| 1 | 1 | 1 | 304 |
| 2 | 3 | 3 | 305 |
| 3 | 5 | 5 | 306 |
| 4 | 7 | 7 | 307 |
| ⋮ | | | |

FIG.3

| ID (401) | Training Image (402) | Correct Answer Class (403) | |
|---|---|---|---|
| 1 | 1 | 1 | 404 |
| 2 | 1 | 1 | 405 |
| 3 | 3 | 3 | 406 |
| 4 | 3 | 3 | 407 |
| ⋮ | | | |

| Deformation Processing | Parameter Condition |
|---|---|
| Rotation | − 10 degrees − +10 degrees |
| Enlargement/reduction | 80 % − 175 % |
| Expansion/contraction | −2 pxℓ − +2 pxℓ |
| Aspect ratio change | height : width = 1 : 0.8 − 1.5 |

FIG.7

TRAINING OF NEURAL NETWORKS IN WHICH DEFORMATION PROCESSING OF TRAINING DATA IS ADJUSTED SO THAT DEFORMED CHARACTER IMAGES ARE NOT TOO SIMILAR TO CHARACTER IMAGES OF ANOTHER CLASS

BACKGROUND OF THE INVENTION

Field of the Invention

The present disclosure relates to a technique to generate training data.

Description of the Related Art

In recent years, due to the change in working environment accompanying the spread of computers, the chances that a business document is scanned and computerized are increasing in number. In the computerization-target documents, a document to which a handwritten character is input, for example, such as a receipt, exists and in order to utilize computerized documents for data analysis, such as aggregation, character data is extracted by performing optical character recognition (OCR) for a handwritten character area. Here, as one of the OCR techniques that cope with handwritten characters, there is a method that uses a trained model obtained by performing machine learning, such as a neural network. In this method, first, training is performed by using training data (also called teacher data) that pairs a character image in which a handwritten character is drawn and a correct answer class obtained by converting a character included in the character image into text. Then, by inputting the character image including handwritten characters to the trained model, it is made possible to utilize the handwritten character in the scanned document as text information.

In general, in order to perform image recognition by machine learning, a large number of images is necessary as training data, but various shapes exist as handwritten characters and it is difficult to comprehensively collect images of handwritten characters in all patterns. Consequently, data augmentation of training data is performed generally by performing deformation processing, such as rotation and enlargement/reduction, for the character image for the prepared training data. Japanese Patent Laid-Open No. 2015-69256 has disclosed a technique to generate a large number of pseudo character images as training data by performing deformation processing for images of various elements constituting a character and combining the deformed images.

There is a case where a character image obtained by the deformation processing for obtaining a pseudo character image is similar to a character image of another correct answer class. FIG. 10 shows a specific example thereof. Here, it is assumed that a character image 1001 is obtained as a result of performing processing of 30-degree rotation in the counterclockwise direction as the deformation processing for a character image 1000 whose correct answer class is "7". At this time, the correct answer class of the deformed character image 1001 is "7", but the shape of the character image 1001 is similar to that of a character image 1002 whose correct answer class is "1". In a case where the deformed character image 1001 such as this is used as training data, this is confused with the training data whose correct answer class is "1", and therefore, it is no longer possible to perform correct training. The problem such as this is not taken into consideration in the technique of Japanese Patent Laid-Open No. 2015-69256 described above, and therefore, it is not possible for the technique of Japanese Patent Laid-Open No. 2015-69256 to solve the problem.

SUMMARY OF THE INVENTION

The image processing apparatus according to the present disclosure is an image processing apparatus that generates new training data by performing deformation processing for a character image included in training data, and includes: a memory that stores a program; and a processor that executes the program to perform: obtaining a character image belonging to a first class; obtaining a condition relating to a parameter that is used for the deformation processing and associated with the first class; determining the parameter based on the condition associated with the first class; performing the deformation processing for a character image belonging to the first class using the determined parameter; determining whether or not the deformed character image generated by the deformation processing is similar to a character image belonging to a class different from the first class; and updating the condition associated with the first class in a case where similarity is determined, wherein in a case where the updating is performed, the parameter is determined based on the updated condition and the deformation processing is performed for the character image belonging to the first class.

Further features of the present disclosure will become apparent from the following description of exemplary embodiments with reference to the attached drawings.

BRIEF DESCRIPTION OF THE DRAWINGS

FIG. 3 is a diagram showing an example of a table as a character image DB;

FIG. 4 is a diagram showing an example of a table as a training image DB;

FIG. 7 is a diagram showing an example of a table as a database storing parameter conditions;

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

First Embodiment

<Outline of Image Processing System>

Figure 1:
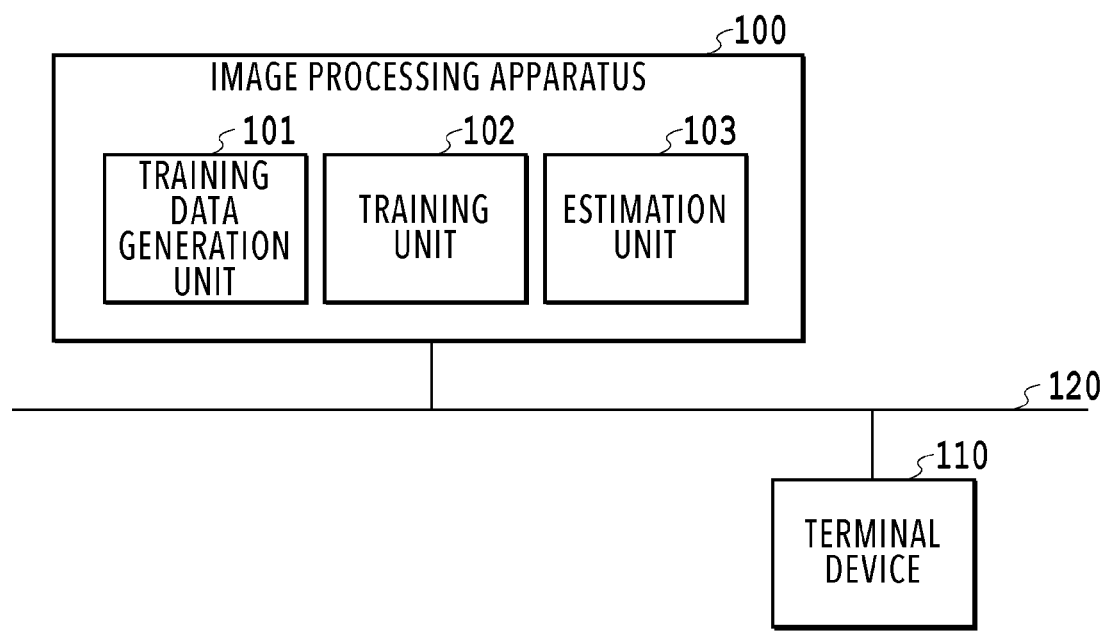
FIG. 1 is a diagram showing an example of a configuration of an image processing system.

FIG. 1 a diagram showing an example of the configuration of an image processing system according to the present embodiment. As shown in FIG. 1, the image processing system includes an image processing apparatus 100 and a terminal device 110 and the image processing apparatus 100 and the terminal device 110 are connected to each other via a network 120.

The image processing apparatus 100 has each function unit of a training data generation unit 101, a training unit 102, and an estimation unit 103. The training data generation unit 101 generates training data for the training unit 102 to perform training of a model of a neural network. The training data is data that pairs a character image in which a handwritten character is drawn and a correct answer class obtained by converting a handwritten character included in the character image into text. Details of the training data that is generated in the training data generation unit 101 will be described later by using FIG. 4.

The training unit 102 performs training of a model of a neural network by using the training data generated by the training data generation unit 101. The model of a neural network that is generated by the training unit 102 is referred to as a "trained model". The training processing by the training unit 102 will be described later by using FIG. 5A. The estimation unit 103 outputs class information to the input character image by estimation using a trained model generated by the training unit 102. The estimation processing by the estimation unit 103 will be descried later by using FIG. 5B.

The terminal device 110 is, for example, an information processing apparatus, such as a PC and a smartphone. It is possible for a user or a system administrator to access the image processing apparatus 100 from the terminal device 110 via the network 120 and check instructions to perform training and the trained model.

The network 120 is a LAN, a public line (WAN) or the like, which connects the image processing apparatus 100 and the terminal device 110 and transmission and reception of data are performed between the image processing apparatus 100 and the terminal device 110 via the network 120.

The above-described system configuration is an example and only the functions necessary for the explanation in the present embodiment are shown schematically. Each apparatus or device may have any logic configuration as long as the configuration is capable of implementing the technique that is disclosed in the present embodiment. For example, in the configuration shown in FIG. 1, the estimation unit 103 is incorporated in the image processing apparatus 100, but it may also be possible for another apparatus separate from the image processing apparatus 100 to have the estimation unit 103.

<Hardware Configuration>

Figure 2A:
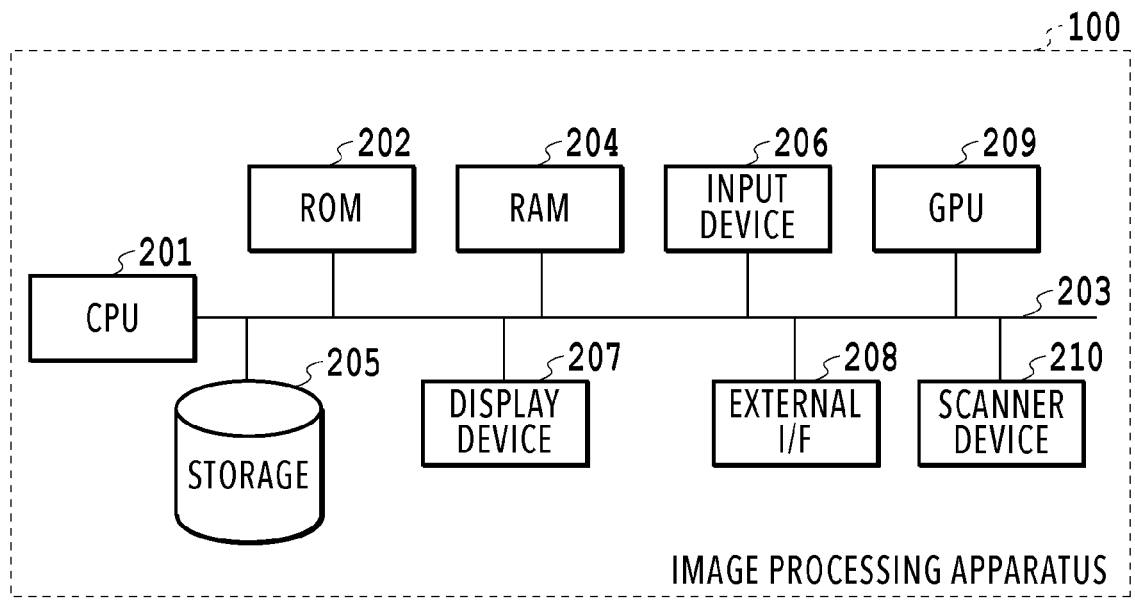
FIG. 2A is a block diagram showing an example of a hardware configuration of an image processing apparatus and FIG. 2B is a block diagram showing an example of a hardware configuration of a terminal device.
Figure 2B:
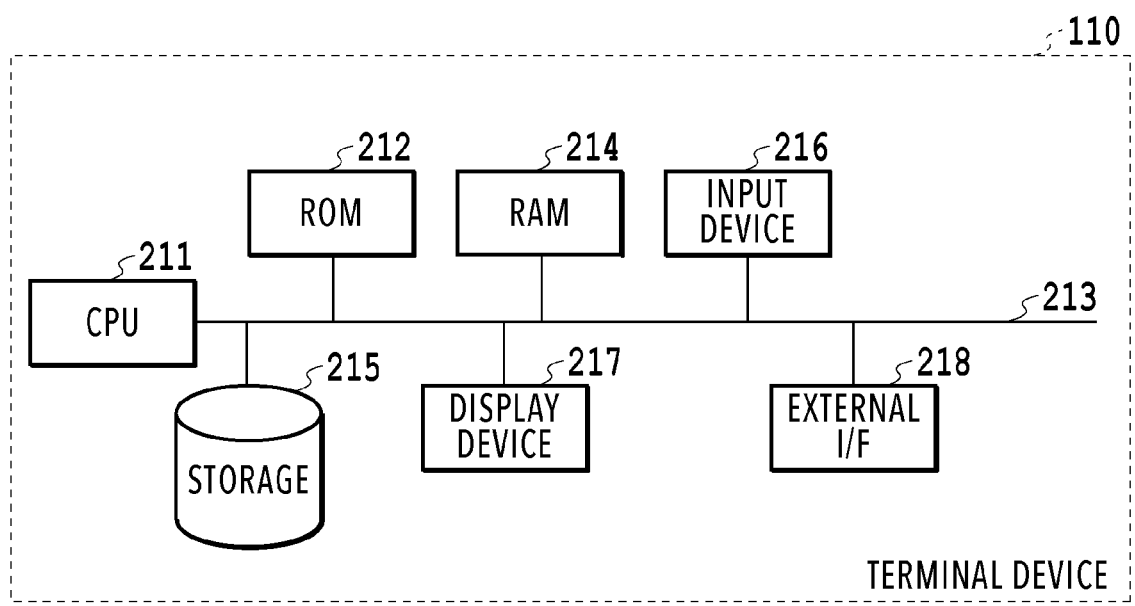

FIG. 2A and FIG. 2B are each a block diagram showing an example of the hardware configuration of the image processing apparatus 100 and the terminal device 110, respectively, in the image processing system shown in FIG. 1.

FIG. 2A is a diagram showing the hardware configuration of the image processing apparatus 100. As shown in FIG. 2A, the image processing apparatus 100 includes a CPU 201, a ROM 202, a RAM 204, a storage 205, an input device 206, a display device 207, an external I/F 208, and a GPU 209 and each unit is connected to one another via a data bus 203.

The CPU 201 is a control device for controlling the entire operation in the image processing apparatus 100. The CPU 201 activates the system of the image processing apparatus 100 by executing a boot program stored in the ROM 202 and executes programs stored in the storage 205. Further, the CPU 201 performs part of the calculation processing that is performed by the training data generation unit 101 and the training unit 102 in cooperation with the GPU 209. The ROM 202 is implemented by a nonvolatile memory and is a storage device that stores the boot program that activates the image processing apparatus 100, and the like. The data bus 203 is a communication path for performing transmission and reception of data between the devices constituting the image processing apparatus 100. The RAM 204 is implemented by a volatile memory and is a storage device that is used as a work memory at the time of the CPU 201 executing programs. The storage 205 is implemented by an HDD (Hard Disk Drive), an SSD (Solid State Drive) and the like and is a large-capacity storage device for storing programs and training data. The programs here include programs for instructing the CPU 201 to perform training data generation processing, training processing, and estimation processing, to be described later. By the CPU 201 executing these programs, the training data generation unit 101, the training unit 102, and the estimation unit 103 described previously are implemented. The input device 206 is implemented by a mouse, a keyboard and the like and receives an operation input to the image processing apparatus 100 from an engineer. The display device 207 is implemented by a liquid crystal display and the like and displays and outputs various setting screens and the like of the image processing apparatus 100 to an engineer. The external I/F 208 is an interface for performing transmission and reception of various kinds of data, commands and the like with the terminal device 110 via the network 120. The GPU 209 is a computing processing device specialized in image processing. The GPU 209 performs computing and the like for updating parameters constituting a training model based on given training data under the control by the CPU 201. A scanner device 210 is a device that scans a document, such as a business form, by using a CCD or the like and generates image data by converting obtained electric signal data.

FIG. 2B is a diagram showing the hardware configuration of the terminal device 110. As shown in FIG. 2B, the terminal device 110 includes a CPU 211, a ROM 212, a RAM 214, a storage 215, an input device 216, a display device 217, and an external I/F 218 and each is connected to one another via a data bus 213. The CPU 211 is a control device for controlling the entire operation in the terminal device 110. The CPU 211 activates the system of the terminal device 110 by executing the boot program stored in the ROM 212 and executes programs stored in the storage 215. The ROM 212 is implemented by a nonvolatile memory and is a storage device that stores the boot program that activates the terminal device 110, and the like. The data bus 213 is a communication path for performing transmission and reception of data between the devices constituting the terminal device 110. The RAM 214 is implemented by a volatile memory and is a storage device that is used as a work memory at the time of the CPU 211 executing image processing programs. The storage 215 is implemented by an HDD (Hard Disk Drive), an SSD (Solid State Device) or the like and is a storage device for storing the programs and the like described previously. The input device 216 is implemented by a mouse, a keyboard and the like and receives an operation input to the terminal device 110 from a user. The display device 217 is implemented by a liquid crystal display and the like and displays and outputs various kinds of information to a user. The external I/F 218 is an interface for performing transmission and reception of various kinds of data, commands and the like with the image processing apparatus 100 via the network 120.

<About Training Data>

Next, training data that is a pair of a character image and a correct answer class, which is used for training of a neural network, is explained. Here, the terms are defined. An image obtained by cutting out a handwritten character area for each character from a scanned image of an actually handwritten document is called a "character image". Then, an image obtained by the training data generation unit 101 performing deformation processing for the character image is called a "training image".

<<Character Image Database>>

Figure 3:
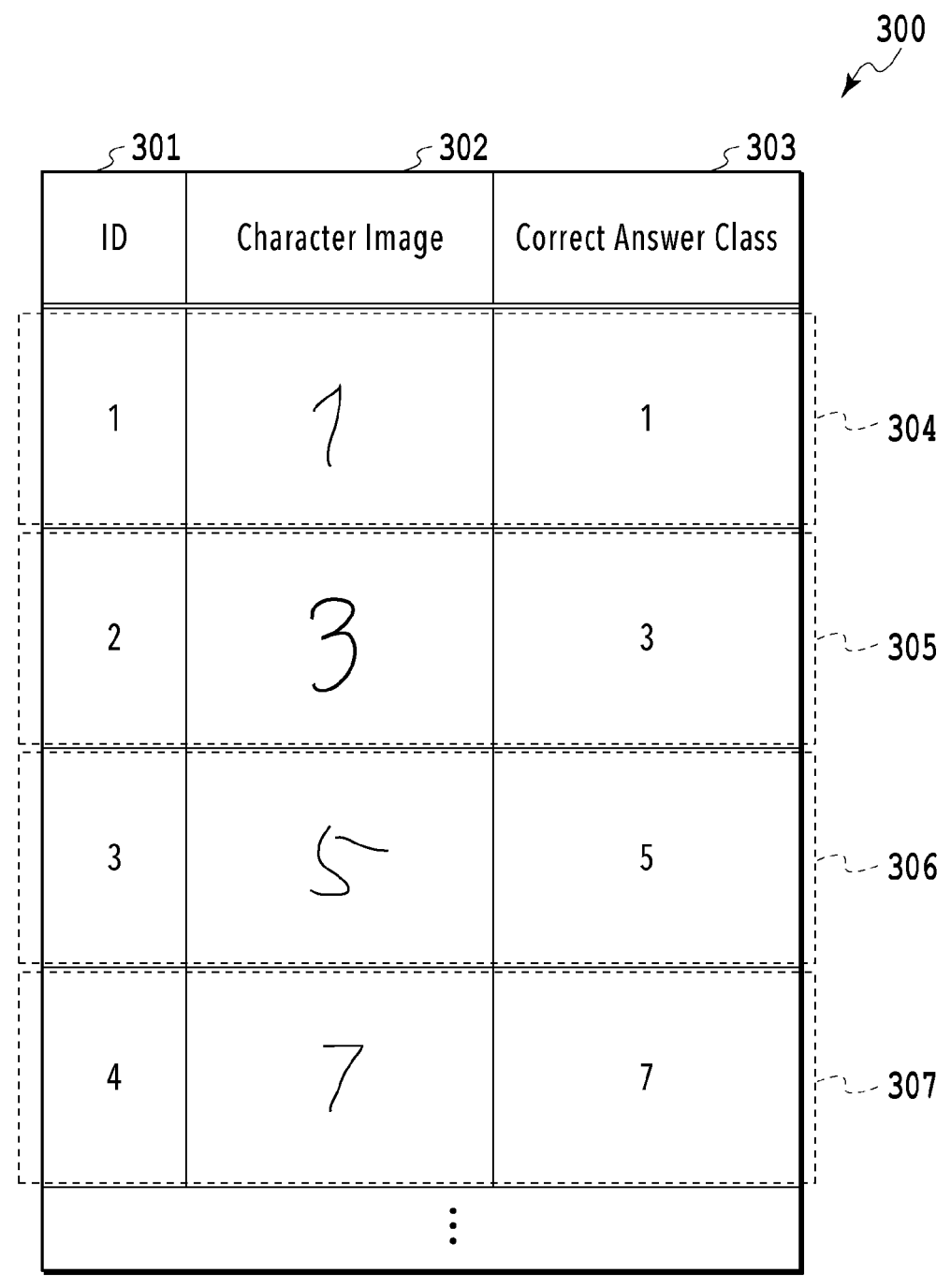

FIG. 3 is a diagram showing an example of a table as a database (in the following, described as "character image DB") for storing character images. In a table 300 as the character image DB, data or a value corresponding to each item of "Record ID" 301, "Character Image" 302, and "Correct Answer Class" 303 is stored. It is assumed that to the character image DB, part of the storage area of the storage 205 is allocated dedicatedly "Record ID" 301 is a field to which identification information for uniquely identifying each record within the table 300 is input. This record ID is attached to a record each time the record is added to the table 300. "Character Image" 302 is a field to which image data corresponding to each handwritten character is input. "Correct Answer Class" 303 is a field in which a handwritten character included within the character image is stored as text data. Here, in the table 300 shown in FIG. 3, four records 304 to 307 associating the character image of a handwritten figure and the correct answer class thereof each other are illustrated.

As described previously, each character image that is stored in the table 300 is obtained by cutting out only the handwritten character portion for each character from an image obtained by scanning a document and the like including handwritten characters, but the obtaining method of a character image is not limited to this. Further, instead of comprehensively managing a plurality of character images as in the table 300 shown in FIG. 3, for example, it may also be possible to perform management by providing a table for each correct answer class.

<<Training Image Database>>

Figure 4:
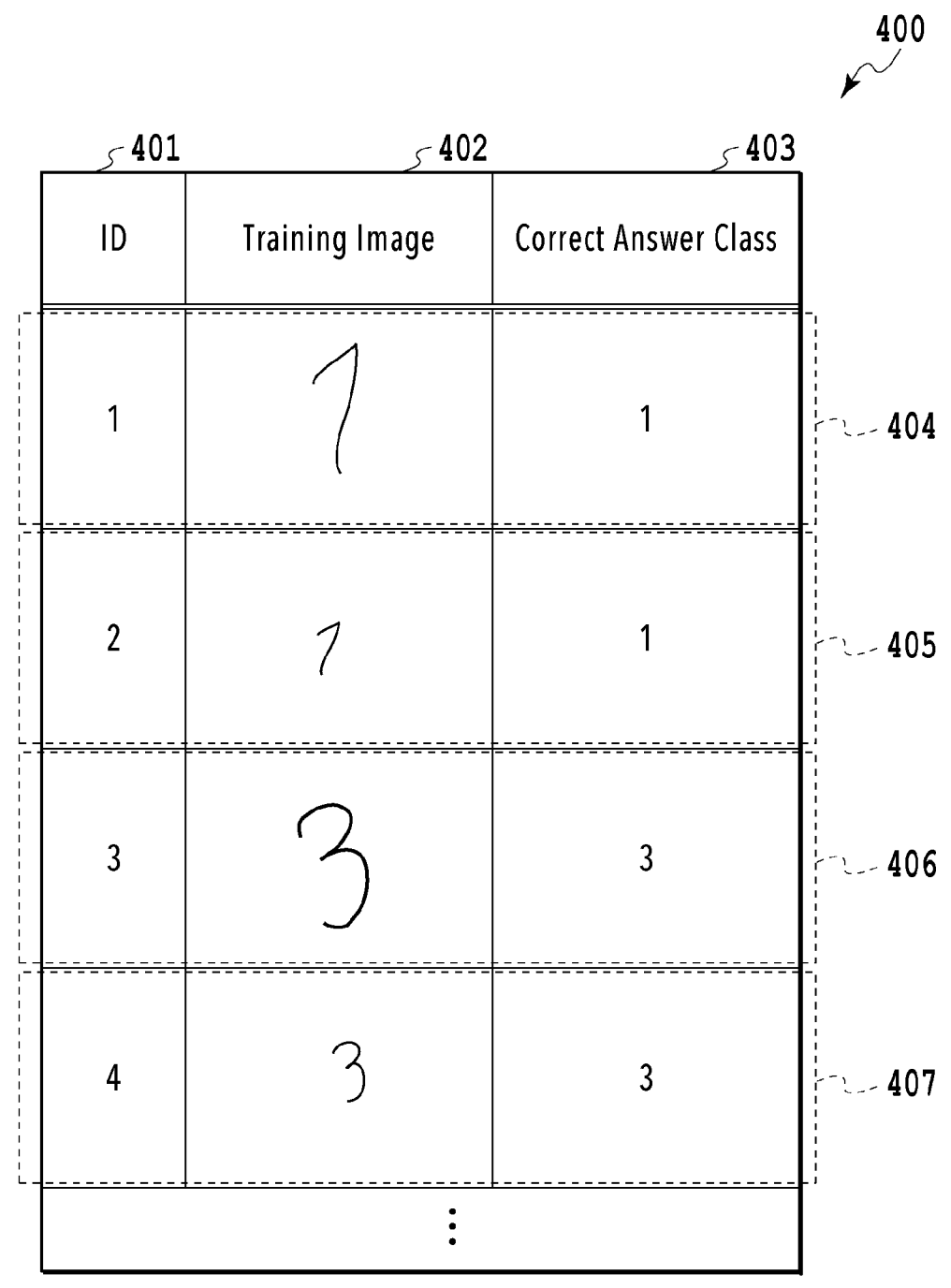

Next, the training image used for training of a neural network is explained, which is generated by the training data generation unit 101 performing deformation processing for the character image stored in the character image DB described above. FIG. 4 is a diagram showing an example of a table as a database (in the following, described as "training image DB") for storing training images generated by the training data generation unit 101. In a table 400 as the training image DB, data or a value corresponding to each item of "Record ID" 401, "Training Image" 402, and "Correct Answer Class" 403 is stored. It is assumed that to the training image DB, part of the storage area of the storage 205 is allocated dedicatedly.

"Record ID" 401 is a field to which identification information for uniquely identifying each record within the table 400 is input. The value in this "Record ID" 401 is attached to a record each time the record is added to the table 400. "Training Image" 402 is a field in which image data generated by deforming a character image is stored. "Correct Answer Class" 403 is a field in which a character included within the training image is stored as text data. Here, in the table 400 shown in FIG. 4, four records 404 to 407 associating the training image obtained by performing deformation processing for each character image in the records 304 to 307 in the table 300 in FIG. 3 and the correct answer class thereof each other are shown. In the specific example shown in the table in FIG. 4, the number of characters included in one training image is one, but it may be possible to adopt a configuration in which the upper limit is set to, for example, five characters and a training image is generated, which consists of an arbitrary number of characters, by rearranging the character images within the range thereof <Training Processing>

Figures 5A, 5B:
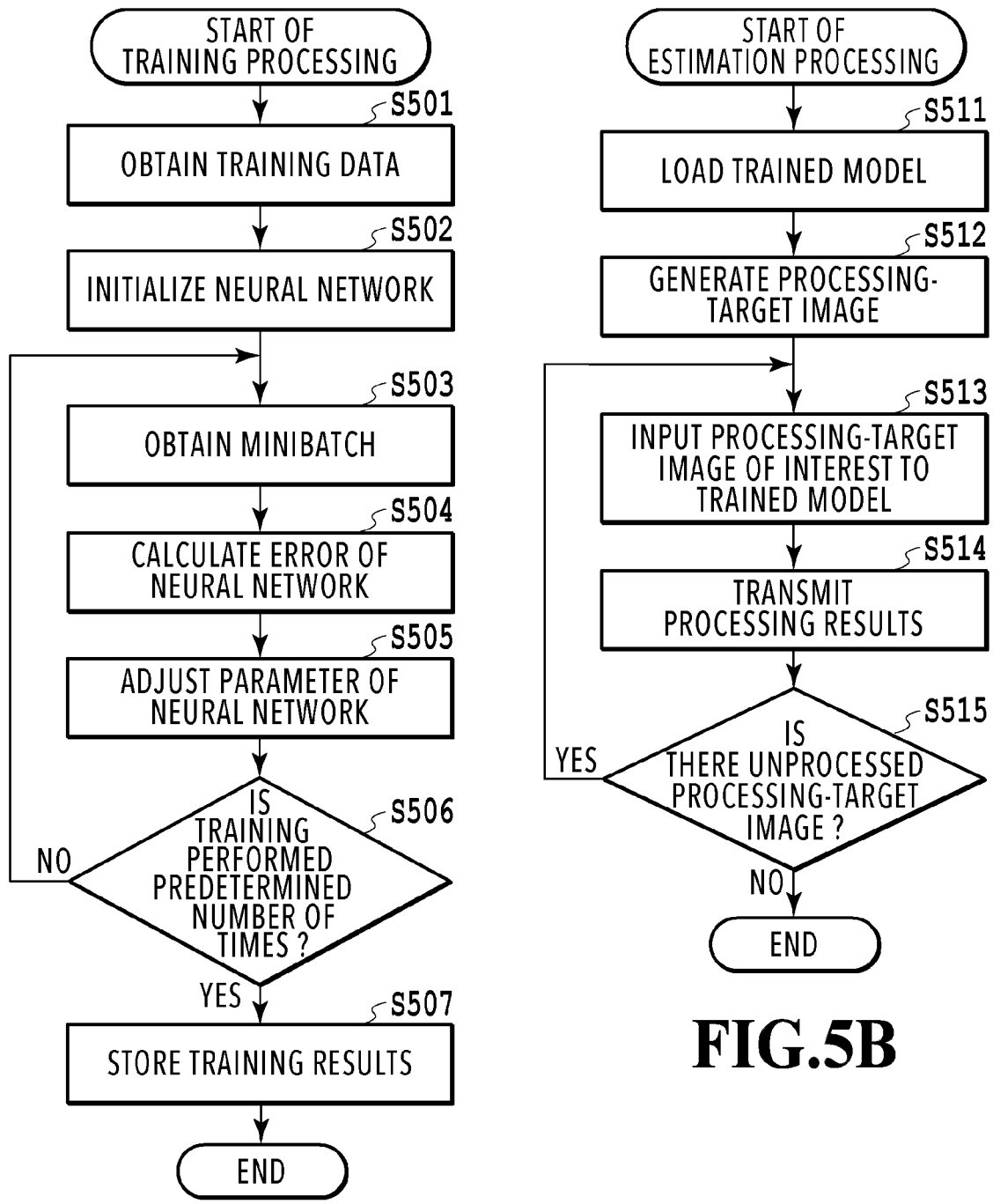
FIG. 5A is a flowchart showing a flow of training processing and FIG. 5B is a flowchart showing a flow of estimation processing.

Next, the training processing by the training unit 102 is explained by using FIG. 5A. FIG. 5A is a flowchart showing a flow of the training processing. Each step shown in the flowchart in FIG. 5A is implemented by the CPU 201 loading a predetermined program stored in the ROM 202 or the like onto the RAM 204 and executing the program. The training processing is started in response to a predetermine operation of a user via the input device 206 of the image processing apparatus 100 or triggered by a predetermine input signal received from the terminal device 110 or the like via the network 120. In the present embodiment, it is assumed that for the training of a neural network, the minibatch method is used. In the following explanation, symbol "S" means a step.

At S501, from the training image DB, a dataset of the training data necessary for training is obtained. Specifically, with reference to each record included in the table 400 as the training image DB, the training data that is a pair of a training image and a correct answer class is obtained.

At S502, a neural network is initialized. Specifically, a neural network is constructed and a value of a parameter included in the neural network is determined randomly. It is possible to use a variety of structures as the neural network that is constructed. For example, it may also be possible to adopt an aspect, such as a CNN (Convolutional Neural Networks).

At S503, a predetermined number (minibatch size, for example ten. In a case where the training aspect of minibatch is not adopted, one) of pieces of training data among the training data read at S501 is obtained. Then, at S504 and S505, training of the neural network is performed.

At S504, an error of the neural network is calculated. Specifically, processing to find an error by inputting a training image that is included in each piece of training data within the minibatch obtained at S503 to the neural network, outputting class information representing a character within the training image, and evaluating a difference between the output and the correct answer class is performed. For the evaluation, it is possible to use CTC (Connectionist Temporal Classification) Loss or the like as an index.

At S505, the parameter of the neural network is adjusted. Specifically, based on the error calculated at S504, for example, processing to change the parameter of the neural network is performed by the backpropagation method.

At S506, whether or not to terminate the training is determined. Specifically, whether or not the processing at S503 to S505 is performed a predetermined number of times (for example, 40,000 times) is checked. Here, it is sufficient to determine the predetermined number of times by, for example, a user inputting a desired number of times at the time of starting training processing. In a case where the processing is performed the predetermined number of times, it is determined that the training is completed and the processing makes a transition to S507. In a case where the processing is not performed the predetermined number of times, the processing returns to S503 and the training of the neural network is continued.

At S507, a trained model including the parameter of the neural network, which has been adjusted at S505, is stored in the storage 205 as the training results.

The above is the contents of the training processing. In the flowchart in FIG. 5A, in the training data obtaining processing (S501), processing is performed so that the training data generated in advance is read, but it may also be possible to perform the generation processing of training data and the training processing in parallel. That is, the configuration may be one in which the training data generation processing, to be described later, is performed prior to the training data obtaining processing (S501) and the training data is obtained by sequential reading from the generated training data.

<Estimation Processing>

Next, the estimation processing by the estimation unit 103 is explained by using FIG. 5B. FIG. 5B is a flowchart showing a flow of the estimation processing. Each step shown in the flowchart in FIG. 5B is implemented by the CPU 201 loading a predetermined program stored in the ROM 202 or the like onto the RAM 204 and executing the program. The estimation processing is started in response to a predetermined operation of a user via the input device 206 of the image processing apparatus 100 or triggered by a predetermined input signal received from the terminal device 110 and the like via the network 120. In the following explanation, symbol "S" means a step.

At S511, the trained model is read. Specifically, first, a neural network having the same structure as that of the neural network constructed at S502 in the flowchart in FIG. 5A described previously is constructed and in the constructed neural network, the trained model stored at S507 described previously is reflected.

At S512, processing to generate an estimation processing-target image (in the following, called "processing-target image") is performed. Specifically, from a scanned image obtained by scanning a document, such as a receipt, pixels corresponding to a handwritten character are extracted, the circumscribed rectangle of the extracted pixel block is found, and an image including pixels with the circumscribed rectangle is obtained. This processing is generally called "block selection" and the image obtained by this is called a "character block". In this manner, from a scanned image of a receipt or the like, one or a plurality of processing-target images is generated.

At S513, a processing-target image of interest among the processing-target images generated at S512 is input to the trained model. Due to this, text information corresponding to the character included in the processing-target image of interest is output as estimation results.

At S514, the estimation results obtained at S513 are transmitted. In the present embodiment, the estimation results are transmitted to the terminal device 110 via the network 120. It may also be possible to adopt a configuration in which the estimation results are stored in the storage 205 instead of transmitting the estimation results to the terminal device 110.

At S515, whether or not to terminate the estimation processing is determined. In a case where the estimation processing is completed for all the processing-target images generated at S512, this processing is terminated. On the other hand, in a case where an unprocessed processing-target image remains, the processing returns to S513, and the next processing-target image of interest is input to the trained model and the estimation processing is continued.

The above is the contents of the estimation processing.

<Training Data Generation Processing>

Figure 6:
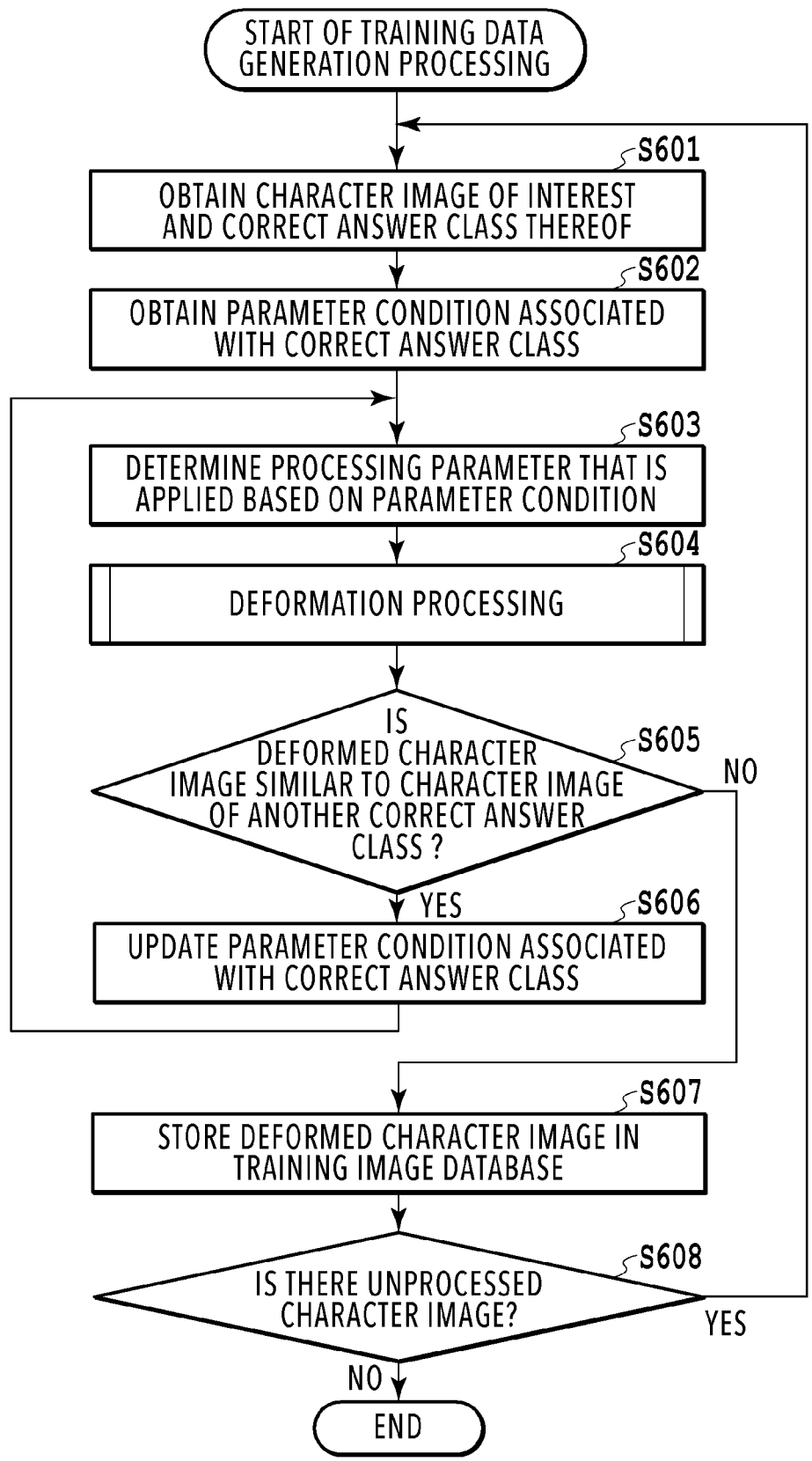
FIG. 6 is a flowchart showing a flow of training data generation processing.

Following the above, the training data generation processing by the training data generation unit 101 is explained by using FIG. 6. FIG. 6 is a flowchart showing a rough flow of the training data generation processing. Each step shown in the flowchart in FIG. 6 is implemented by the CPU 201 loading a predetermined program stored in the ROM 202 or the like onto the RAM 204 and executing the program. The training data generation processing is started in response to a predetermined user operation via the input device 206 of the image processing apparatus 100 or triggered by a predetermined input signal received from the terminal device 110 or the like via the network 120. In the following explanation, symbol "S" means a step.

At S601, from the character image DB (for example, the above-described table 300), a pair of the character image of interest and the correct answer class is obtained.

At S602, conditions of processing parameters (in the following, described as "parameter conditions") in deformation processing (S604), to be described later, are obtained based on the correct answer class obtained at S601. Specifically, with reference to a table 700 as shown in FIG. 7, which is prepared in advance for each correct answer class (here, for each of "1" to "9"), the conditions of the processing parameters are obtained. Here, in the table 700 in FIG. 7, data or values corresponding to each item of "Deformation Processing" 701 and "Parameter Condition" 702 are stored. "Deformation Processing" 701 is a field in which specific processing contents to deform a character image are specified. "Parameter Condition" 702" is a field in which the range of deformation amount (to what extent deformation is performed at most) for each piece of the image processing specified in "Deformation Processing" 701 in the table 700. In a record 703 that specifies "Rotation" as the contents of the deformation processing, the range indicated in "Parameter Condition" 702 is "−10 degrees to +10 degrees". In this case, it is meant that the character image of interest is rotated in the range of −10 degrees to +10 degrees. Then, at the time of applying the rotation processing to the character image, an angle by which the character image is rotated actually within the range of "−10 degrees to +10 degrees" is determined randomly. Similarly, in a record 704 that specifies "Enlargement/reduction" as the deformation processing contents, the range indicated in "Parameter Condition" 702 is "80% to 175%". In this case, it is meant that the character image of interest is reduced or enlarged in the range of 0.8 times to 1.75 times and at the time of actually applying the enlargement/reduction processing, a magnification is determined randomly in the range of "80% to 175%". Similarly, in a record 705 that specifies "Expansion/contraction" as the deformation processing contents, the range indicated in "Parameter Condition" 702 is "−2 pxl to 2 pxl". In this case, it is meant that the pixel within the processing-target character image is contracted or expanded in the range of −2 pixels to 2 pixels and at the time of actually applying the expansion/contraction processing, a contraction ratio or an expansion ratio is determined randomly within the range of "−2 pxl to 2 pxl". Similarly, in a record 706 that specifies "Aspect ratio change" as the deformation processing contents, the range indicated in "Parameter Condition" 702 is "height: width=1:0.8 to 1.5". In this case, it is meant that the width at the time of taking the height of the character image of interest to be 1 is extended or reduced in the range of 0.8 to 1.5. Then, at the time of actually applying the aspect ratio change processing, a width in a case where the height of the character image is taken to be 1 is determined randomly within the range of 0.8 to 1.5. Here, the table as the database storing the parameter conditions is provided for each correct answer class, but it may also be possible to cause a plurality of correct answer classes to use a common table.

At S603, based on the parameter condition obtained at S602, the processing parameter that is applied in the next deformation processing (S604) is determined. Specifically, the parameter value in each piece of the image processing of the rotation processing, the enlargement/reduction processing, expansion/contraction processing, and the aspect ratio change processing is selected randomly from the range indicated in "Parameter Condition" 702 in the table 700 in FIG. 7. In a case where "0" is selected from the range specified by the parameter condition, "None" indicating that the image processing as the deformation processing is not performed is the parameter value.

At S604, for the character image obtained at S601, the deformation processing using the processing parameter determined at S603 is performed.

<<Details of Deformation Processing>>

Figure 8:
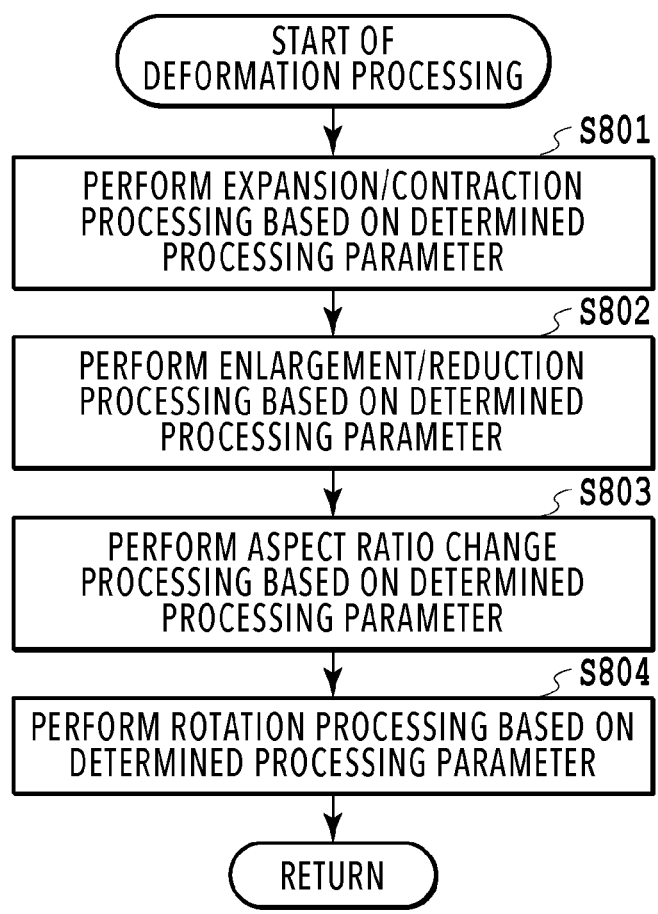
FIG. 8 is a flowchart showing details of deformation processing.

FIG. 8 is a flowchart showing details of the deformation processing. In the following, along the flow in FIG. 8, the contents of the deformation processing are explained in detail.

At S801, based on the processing parameter determined for the expansion/contraction processing at S603, the expansion/contraction processing is performed for the character image obtained at S601. At this time, in a case where the parameter value is "None", the expansion/contraction processing is not performed. Although the expansion/contraction processing is a publicly known technique, and therefore, details are omitted, it is possible to, for example, implement expansion by detecting the boundary portion of characters within the image and embedding the outside of the boundary portion with a predetermined number of pixels, and contraction by embedding the inside of the boundary portion with a predetermined number of white pixels, respectively. Further, it may also be possible to implement expansion/contraction by performing replacement processing in accordance with the pixel state within a filter by using a filer of a predetermined size.

At S802, based on the processing parameter determined for the enlargement/reduction processing, the enlargement/reduction processing is performed for the character image obtained at S601. At this time, in a case where the parameter value is "None", the enlargement/reduction processing is not performed. The enlargement/reduction processing is a publicly known technique, and therefore, details are omitted.

At S803, based on the processing parameter determined for the aspect ratio change processing, the aspect ratio change processing is performed for the character image obtained at S601. At this time, in a case where the parameter value is "None", the aspect ratio change processing is not performed. The aspect ratio change processing is a publicly known technique, and therefore, details are omitted.

At S804, based on the processing parameter determined for the rotation processing at S603, the rotation processing is performed for the character image obtained at S601. At this time, in a case where the parameter value is "None", the rotation processing is not performed. The rotation processing is a publicly known technique, and therefore, details are omitted.

The above is the deformation processing contents. The flowchart in FIG. 8 is an example and for example, it may also be possible to exchange the order of the above-described four kinds of image processing, newly incorporate another kind of image processing, and so on. Explanation is returned to the flowchart in FIG. 6.

At S605, whether or not the character image obtained by the deformation processing at S604 is similar to a character image belonging to another correct answer class is determined. This determination is performed by, for example, using the trained model stored in the storage 205. In a case where the deformed character image is input to the trained model and the correct answer class of the input character image and the class indicated by the class information that is output by the trained model are different, it is possible to determine that the deformed character image is similar to a character image belonging to another correct answer class. In a case where the deformed character image is similar to a character image of another correct answer class, the processing advances to S606 and in the other case, the processing advances to S607.

At S606, the parameter condition associated with the correct answer class obtained at S601 is updated. Details of the updating processing will be described later. In a case where the updating processing of the parameter condition is completed, the processing returns to S603 and in accordance with the updated parameter condition, the processing parameter that is applied in the deformation processing is redetermined and the deformation processing in which the redetermined processing parameter is applied is performed again.

At S607, the results (deformed character image) of the deformation processing at S604 are stored in the training image DB. After the storage, at S608, whether or not all the character images within the character image DB are processed is determined. In a case where there is an unprocessed character image, the processing returns to S601, and a pair of the next character image of interest and the correct answer class is obtained and the processing is continued. On the other hand, in a case where all the character images are processed, this processing is terminated.

Figure 9A:
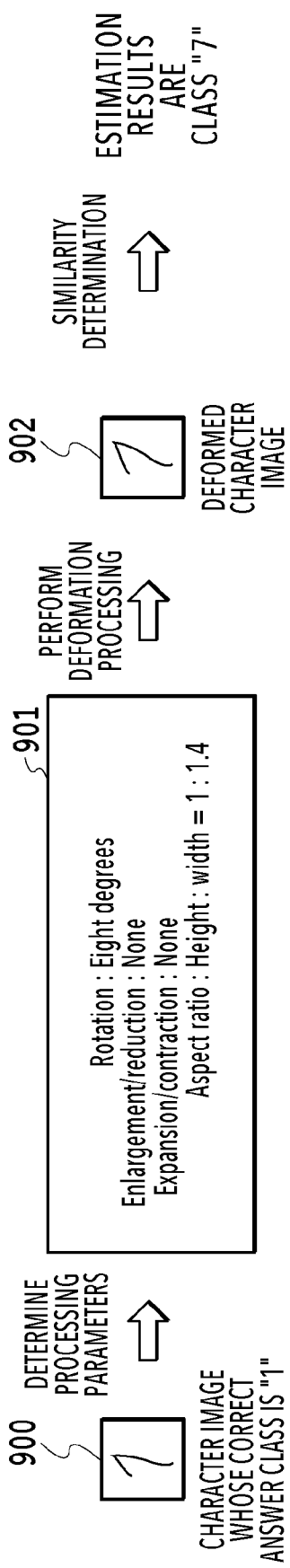
FIG. 9A and FIG. 9B are diagrams explaining change and updating of parameter conditions.
Figure 9B:
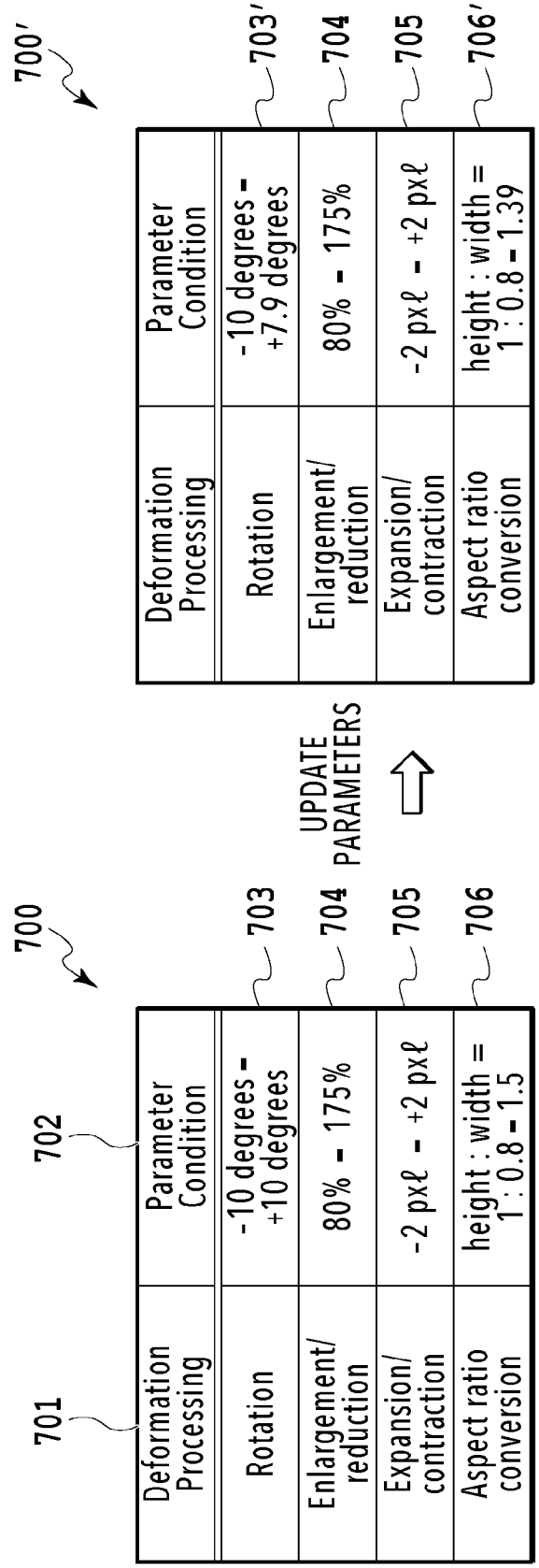
Figure 10:
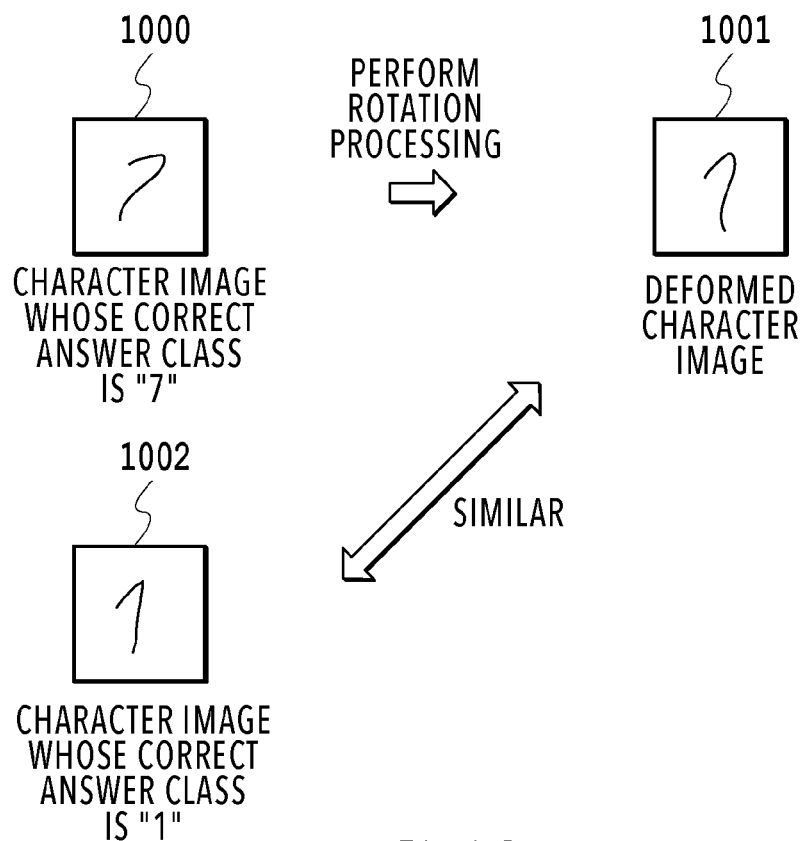
FIG. 10 is a diagram explaining a problem of the present invention.

The above is the contents of the training data generation processing. Here, by using a specific example, how training data is generated in the present embodiment is explained along the flow in FIG. 6. First, as a pair of the character image of interest and the correct answer class thereof, a pair of a character image 900 shown in FIG. 9A and a correct answer class "1" is obtained (S601). Next, as the parameter condition, the contents indicating the table 700 in FIG. 7 are obtained (S602). Following this, based on the obtained parameter condition, each processing parameter is determined as within a frame 901 in FIG. 9A (S603). Here, for the rotation processing, "Eight degrees", for the enlargement/reduction processing and the expansion/contraction processing, "None", and for the aspect ratio change processing, "Height: width=1:1.4" are determined. The results of the deformation processing (S604) in accordance with these processing parameters are a character image 902. Then, whether the deformed character image 902 is similar to a character image of another correct answer class is determined (S605). In the example in FIG. 9A, the estimation results of the deformed character image 902 are class "7" and this is different from the correct answer class "1" of the character image 900 before the deformation. Consequently, it is determined that the deformed character image 902 is "similar" to a character image belonging to another correct answer class (YES at S605). In response to the determination results, as shown in FIG. 9B, the parameter conditions associated with the correct answer class "1" are updated as in an updated table 700' so that the parameter conditions determined at S602 are not included. Here, for the rotation processing, the processing parameter determined at S602 is "Eight degrees", and therefore, the condition range is changed (as indicated at 703') to "−10 degrees to +7.9 degrees" not including "Eight degree". Further, similarly for the aspect ratio change processing, the processing parameter determined at S602 is "Height: width=1:1.4", and therefore, the condition range is changed (as indicated at 706') to "height: width=1:0.8 to 1.39" not including this. The processing parameters are redetermined (S603) in accordance with the thus updated parameter conditions and the deformation processing is performed again. Then, in a case where the deformed character image obtained by the deformation processing after the parameter conditions are changed is not similar to a character image of another correct answer class, the deformed character image is stored in the training image DB. As described above, by repeating the updating of the parameter conditions and the deformation processing, the deformed character image being similar to a character image of another correct answer class is suppressed, and therefore, the quality of the training data improves.

Modification Example 1

In the above-described embodiment, in a case where it is determined that the deformed character image is similar to a character image of another correct answer class, the parameter conditions are changed/updated so that none of all the processing parameters applied at the time of the deformation is included. However, for example, it may also be possible to change/update the parameter condition so that only part of the processing parameters applied at the time of deformation are not included. In this case, for example, in the specific example in FIG. 9A described previously, the deformation processing is performed by applying the rotation angle and the aspect ratio one by one, which are determined as the processing parameters, and whether or not there is similarity is performed for each deformed character image. Then, it is sufficient to change/update the parameter condition so that the processing parameter applied at the time of the deformation is not included by taking the parameter condition for which the determination results indicate similarity as a target. As described above, it may also be possible to take only the parameter condition that gives influence as a target of change/updating by ascertaining the cause of the determination result of similarity.

Modification Example 2

In the first embodiment described above, the deformation processing is performed for one character image obtained from the character image DB and based on the result of the similarity determination for the results, whether or not it is necessary to update the parameter condition is determined. However, in a case where the parameter condition is updated based on only the results of the similarity determination for one character image, there is a possibility that the parameter condition is affected by a singular character image (for example, in a case where the character image before deformation is originally similar to a character image of another correct answer class). Consequently, it may also be possible to determine whether or not it is necessary to update the parameter condition based on the results of the similarity determination for a plurality of deformed character images. At that time, it is sufficient to perform the determination by the following procedure.

First, at S601, from the character image DB, a plurality of character images whose correct answer class is the same (for example, five character images whose correct answer class is "1") is obtained. Then, at S602, the parameter condition associated with the correct answer class is obtained, the processing parameter is determined in accordance with the parameter condition at S603, and the deformation processing is performed for the plurality of character images at S604. Then, the similarity determination with a character image of another correct answer class is performed for each of the deformed character images at S605. As a result of that, in a case where the number of character images for which the determination results are "similar" is larger than or equal to a predetermined number (for example, three), the parameter is updated at S606. Due to this, it is possible to lessen the influence by the singular character image.

As above, according to the present embodiment, in a scene where a pseudo character image is generated by performing deformation processing for a character image, it is possible to suppress a character image that impedes training from being generated.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, in a scene where a pseudo character image is generated by performing deformation processing for a character image, it is possible to suppress a character image that impedes training from being generated.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-100215, filed Jun. 16, 2021 which are hereby incorporated by reference wherein in its entirety.

What is claimed is:

1. An image processing apparatus that generates new training data by performing deformation processing for character images included in training data, the image processing apparatus comprising:
a memory that stores a program; and
a processor that executes the program to perform:
obtaining a character image and a correct answer class corresponding to the obtained character image from a database, wherein the obtained correct answer class is stored in association with the obtained character image in the database;
obtaining a condition relating to a parameter that is used for the deformation processing based on the obtained correct answer class corresponding to the obtained character image;
determining the parameter based on the obtained condition;
performing the deformation processing for the obtained character image using the determined parameter, so as to obtain a deformed character image;
determining whether or not the deformed character image generated by the deformation processing is similar to another character image belonging to another correct answer class different from the obtained correct answer class;
updating, in a case where it is determined that the deformed character image is similar to the other character image, the obtained condition so that the obtained condition does not include the determined parameter, wherein
in a case where the updating is performed, a new parameter is determined based on the updated obtained condition and the deformation processing using the determined new parameter is performed for the obtained character image so as to obtain a new deformed character image; and
storing the new deformed character image and the obtained correct answer class as the new training data in a case where it is determined that the new deformed character image is not similar to the other character image belonging to the other correct answer class different from the obtained correct answer class.

2. The image processing apparatus according to claim 1, wherein
the updating of the obtained condition associated with the obtained correct answer class is performed in a case where it is determined that a predetermined number of character images or more among a plurality of deformed character images obtained by performing the deformation processing using the determined parameter for a plurality of character images are similar to the other character image belonging to the other correct answer class different from the obtained correct answer class.

3. The image processing apparatus according to claim 1, wherein
the deformation processing using the determined parameter includes one of rotation, enlargement or reduction, expansion or contraction, and aspect ratio change.

4. An image processing method of generating new training data by performing deformation processing for character images included in training data, the method comprising the steps of:
obtaining a character image and a correct answer class corresponding to the obtained character image from a database, wherein the obtained correct answer class is stored in association with the obtained character image in the database;
obtaining a condition relating to a parameter that is used for the deformation processing based on the obtained correct answer class corresponding to the obtained character image;
determining the parameter based on the obtained condition;
performing the deformation processing for the obtained character image using the determined parameter, so as to obtain a deformed character image;
determining whether or not the deformed character image generated by the deformation processing is similar to another character image belonging to another correct answer class different from the obtained correct answer class;
updating, in a case where it is determined that the deformed character image is similar to the other character image, the obtained condition so that the obtained condition does not include the determined parameter, wherein
in a case where the updating is performed, a new parameter is determined based on the updated obtained condition and the deformation processing using the determined new parameter is performed for the obtained character image so as to obtain a new deformed character image; and
storing the new deformed character image and the obtained correct answer class as the new training data in a case where it is determined that the new deformed character image is not similar to the other character image belonging to the other correct answer class different from the obtained correct answer class.

5. A non-transitory computer readable storage medium storing a program for causing a computer to perform an image processing method of generating new training data by performing deformation processing for character images included in training data, the method comprising the steps of:
obtaining a character image and a correct answer class corresponding to the obtained character image from a database, wherein the obtained correct answer class is stored in association with the obtained character image in the database;
obtaining a condition relating to a parameter that is used for the deformation processing based on the obtained correct answer class corresponding to the obtained character image;
determining the parameter based on the obtained condition;
performing the deformation processing for the obtained character image using the determined parameter, so as to obtain a deformed character image;
determining whether or not the deformed character image generated by the deformation processing is similar to another character image belonging to another correct answer class different from the obtained correct answer class;
updating, in a case where it is determined that the deformed character image is similar to the other character image, the obtained condition so that the obtained condition does not include the determined parameter, wherein
in a case where the updating is performed, a new parameter is determined based on the updated obtained condition and the deformation processing using the determined new parameter is performed for the obtained character image so as to obtain a new deformed character image; and storing the new deformed character image and the obtained correct answer class as the new training data in a case where it is determined that the new deformed character image is not similar to the other character image belonging to the other correct answer class different from the obtained correct answer class.

\* \* \* \* \*